United States Patent
Naito et al.

(10) Patent No.: US 9,595,394 B2
(45) Date of Patent: Mar. 14, 2017

(54) SOLID ELECTROLYTIC CAPACITOR, ANODE LEAD CONNECTION METHOD FOR THE SAME, AND PRODUCTION METHOD FOR SOLID ELECTROLYTIC CAPACITOR

(71) Applicant: SHOWA DENKO K.K., Tokyo (JP)

(72) Inventors: Kazumi Naito, Tokyo (JP); Katsutoshi Tamura, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 14 days.

(21) Appl. No.: 14/773,520

(22) PCT Filed: Jun. 16, 2014

(86) PCT No.: PCT/JP2014/065866
§ 371 (c)(1),
(2) Date: Sep. 8, 2015

(87) PCT Pub. No.: WO2014/203846
PCT Pub. Date: Dec. 24, 2014

(65) Prior Publication Data
US 2016/0027588 A1     Jan. 28, 2016

(30) Foreign Application Priority Data
Jun. 17, 2013  (JP) .................................. 2013-126578

(51) Int. Cl.
*H01G 9/15* (2006.01)
*H01G 9/042* (2006.01)
(Continued)

(52) U.S. Cl.
CPC ........... *H01G 9/042* (2013.01); *H01G 9/0029* (2013.01); *H01G 9/012* (2013.01); *H01G 9/15* (2013.01); *H01G 9/052* (2013.01); *H01G 9/08* (2013.01)

(58) Field of Classification Search
CPC .................................. H01G 9/008; H01G 9/15
See application file for complete search history.

(56) References Cited

U.S. PATENT DOCUMENTS 3,516,150 A * 6/1970 Leech .................... H01G 9/012
29/25.03
2004/0016978 A1   1/2004 Yano et al.
(Continued)

FOREIGN PATENT DOCUMENTS

JP   2001-267180 A   9/2001
JP   2003-163137 A   6/2003
(Continued)

OTHER PUBLICATIONS

International Search Report dated Sep. 16, 2014 issued in corresponding PCT/JP2014/065866 application (pp. 1-4).

*Primary Examiner* — Dion R Ferguson
(74) *Attorney, Agent, or Firm* — Millen, White, Zelano & Branigan, P.C.; William Nixon (57) ABSTRACT

A solid electrolytic capacitor capable of assuredly connecting to a bolster member is provided. A solid electrolytic capacitor having a capacitor element with an anode made of tungsten is accommodated in a box-shaped case. An anode lead is connected to an anode circuit pattern provided on a bottom wall inner surface of the box-shaped case. In a state in which the anode lead is covered by an oxide film and is in direct contact with the anode circuit pattern, a conductive material is adhered between the anode lead and the anode circuit pattern to thereby form a conductive connection layer. The anode lead and the conductive connection layer are connected via the conductive film layer. The conductive film layer is connected to the anode lead at the film removed portion in which the oxide film has been removed from the surface of the anode lead.

7 Claims, 7 Drawing Sheets

(51) Int. Cl.
- *H01G 9/012* (2006.01)
- *H01G 9/00* (2006.01)
- *H01G 9/08* (2006.01)
- *H01G 9/052* (2006.01)

(56) References Cited

U.S. PATENT DOCUMENTS

| | | |
|---|---|---|
| 2004/0103508 A1 | 6/2004 | Kanetake |
| 2008/0310081 A1* | 12/2008 | Shimizu ............... H01G 9/012 361/529 |
| 2009/0244814 A1 | 10/2009 | Tokashiki et al. |
| 2012/0028433 A1* | 2/2012 | Naito .................. H01G 9/012 438/381 |
| 2012/0257325 A1 | 10/2012 | Zednickova |

FOREIGN PATENT DOCUMENTS

| | | |
|---|---|---|
| JP | 2004-349658 A | 12/2004 |
| JP | 2009-260235 A | 11/2009 |
| JP | 2012-222344 A | 11/2012 |

* cited by examiner

SOLID ELECTROLYTIC CAPACITOR, ANODE LEAD CONNECTION METHOD FOR THE SAME, AND PRODUCTION METHOD FOR SOLID ELECTROLYTIC CAPACITOR

TECHNICAL FIELD

The present invention relates to a solid electrolytic capacitor in which a capacitor element having an anode made of tungsten is sealed by a box-shaped case, an anode lead connection method for the solid electrolytic capacitor, and a production method for the solid electrolytic capacitor.

BACKGROUND TECHNIQUE

Conventionally, as solid electrolytic capacitors, a resin mold sealed type solid electrolytic capacitor in which a capacitor element is sealed by molding a synthetic resin or a box sealed type solid electrolytic capacitor in which a capacitor element is sealed by a box-shaped case are well known.

For example, as shown in Patent Document 1 listed below, in the box sealed type solid electrolytic capacitor, in a state in which a capacitor element is accommodated inside a case main body having a bottom wall and peripheral side walls provided at peripheral four sides (outer peripheral edge portions) of the bottom wall, an upper opening of the case main body is closed in a sealed manner by an upper lid.

In such a solid electrolytic capacitor, an anode lead of the capacitor element is electrically connected to an anode circuit pattern by welding processing. In cases where the anode lead and the anode circuit pattern are spatially distanced, there exists a case in which the anode lead is electrically connected to the anode circuit pattern via a conductive auxiliary member made of, e.g., a metal member (hereinafter referred to as "bolster member"). The anode lead and the bolster member are generally connected them by welding processing.

In general, the anode lead of the solid electrolytic capacitor is structured by valve action metal, and the surface of the anode lead is covered by a natural oxide film. Therefore, when connecting a bolster member to the anode lead, it is difficult to electrically connect using conductive material such as a silver paste.

For this reason, conventionally, the oxide film of the anode lead at the contact portion of the anode lead and the bolster member is broken by resistance welding, so that the anode lead is electrically and mechanically connected to the bolster member by welding.

Concretely, when performing resistance welding, one of welding electrodes is connected to the anode circuit pattern and the other welding electrode is connected to the upper side of the anode lead of the capacitor element, and electric current is applied in series while pressuring them to perform welding so that the anode lead and the bolster member are connected electrically and mechanically.

PRIOR ART DOCUMENT

Patent Document

[Patent Document 1] Japanese Patent No. 4879845

DISCLOSURE OF THE INVENTION

Problems to be Solved by the Invention

However, in the aforementioned conventional solid electrolytic capacitor, in the method of connecting the anode lead and the bolster member, a high current is momentarily applied to three types of members (materials), i.e., the anode lead, the bolster member and the anode circuit pattern, in series to thereby connect them. Therefore, it is difficult to appropriately control the amount of current between the anode lead and the bolster member. For this reason, for example, there are risks that when the amount of current is too large, an excessive shock occurs, causing a displacement of a capacitor element from the mounting position, while when the amount of current is too small, the oxide film formed on the anode lead cannot be broken, causing a connection failure (open failure).

In order to avoid the open failure, it is conceivable to increase the weld strength. However, doing so causes another problems, such as, e.g., defects such as adhesion of the anode lead to the welding electrode, defects such as deformation or meltdown of the anode lead, causing a LC failure due to destruction of the dielectric layer. Such inconvenience of destruction of dielectric layer is especially remarkable in the case of using a capacitor element having an anode made of tungsten because tungsten is harder than tantalum, etc., and a larger stress will be applied to the oxide film.

The present invention was made in view of the aforementioned problems, and aims to provide a solid electrolytic capacitor sealed by a box-shaped case and equipped with a capacitor element having an anode made of tungsten capable of assuredly connecting an anode lead to an anode circuit pattern or a bolster member connected to the anode circuit pattern while preventing an occurrence of open failure electrically and mechanically, an anode lead connection method, and a production method of a solid electrolytic capacitor.

Other purposes and advantages of the present invention will be apparent from the following embodiments.

Means for Solving the Problems

In order to attain the aforementioned purposes, the present invention can be summarized as having the following structure.

[1] A solid electrolytic capacitor comprising:

a capacitor element equipped with an anode made of tungsten, the anode including an anode lead implanted in the anode and covered with an oxide film, and the anode lead being protruded from an end face of the anode; and a box shaped case in which the capacitor element is accommodated, the box shaped case including a bottom wall inner surface to which an anode circuit pattern is provided, and the anode lead being connected to the anode circuit pattern electrically and mechanically, wherein in a state in which the anode lead is directly connected to the anode circuit pattern, between the anode lead and the anode circuit pattern, a conductive material is adhered and a conductive connection layer is formed, wherein the anode lead and the conductive connection layer are connected via a conductive film layer, and wherein the conductive film layer is connected to the anode lead at a film removed portion in which the oxide film is removed from a surface of the anode lead.

[2] The solid electrolytic capacitor as recited in the aforementioned Item [1], wherein a bolster member as a conductive auxiliary member is provided on the anode circuit pattern of the bottom wall inner surface of the box-shaped case, and wherein the anode lead is connected to the bolster member.

[3] The solid electrolytic capacitor as recited in the aforementioned Item [1] or [2],
wherein the conductive film layer is formed so as to cover an entire region of the film removed portion.

[4] The solid electrolytic capacitor as recited in any one of the aforementioned Items [1] to [3],
wherein an upper wall inner surface of the box-shaped case and an upper surface of the capacitor element are adhesively fixed via an adhesive agent.

[5] The solid electrolytic capacitor as recited in any one of the aforementioned Items [1] to [4],
wherein a gap is provided around a base portion of the anode lead to the anode.

[6] An anode lead connection method of a solid electrolytic capacitor for electrically and mechanically connecting an anode lead protruded from an end face of an anode made of tungsten and covered with an oxide film to an anode circuit pattern separately provided, comprising:
forming a film removed portion by removing the oxide film;
forming a conductive film layer by adhering a conductive material on the film removed portion;
connecting the conductive film layer and the anode circuit pattern by adhering a conductive material to form a conductive connection layer between the conductive film layer and the anode circuit pattern in a state in which the anode lead is directly connected to the anode circuit pattern, and
wherein the conductive film layer is formed at a position not interfering direct contact of the anode lead to the anode circuit pattern.

[7] A production method of a solid electrolytic capacitor including a capacitor element equipped with an anode made of tungsten, the anode including an anode lead implanted in the anode and covered with an oxide film, and the anode lead being protruded from an end face of the anode, and a box shaped case in which the capacitor element is accommodated, the box shaped case including a bottom wall inner surface to which an anode circuit pattern is provided, and the anode lead being connected to the anode circuit pattern,
wherein a connection of the anode lead to the anode circuit pattern is performed by the method as recited in the aforementioned Item [6].

Effects of the Invention

According to the present invention, in a solid electrolytic capacitor in which a capacitor element having an anode made of tungsten is sealed by a box-shaped case, an impact shock to a dielectric layer by resistance welding for connecting the anode lead and the anode circuit pattern can be avoided.

For this reason, in the solid electrolytic capacitor of the invention [1], an occurrence of poor contact between the anode lead and the anode circuit pattern can be prevented. Further, in the present invention, since the anode lead is in direct contact with the anode circuit pattern, it is possible to prevent the occurrence of variation in the height position of the capacitor element with respect to the box-shaped case, enabling fixing of the capacitor element in the box-shaped case with high positional accuracy, which in turn can provide a higher quality capacitor product.

According to the solid electrolytic capacitor of the invention [2], since the anode circuit pattern has a bolster member, the anode lead can be connected to the anode circuit pattern without bending it.

According to the solid electrolytic capacitor of the invention [3], deterioration of ESR can be prevented. It is assumed that this deterioration of ESR is caused by an oxide film formed again from the region not covered with a conductive covering film and invading partially under the conductive covering film.

According to the solid electrolytic capacitor of the invention [4], thermal deformation can be prevented more assuredly.

According to the solid electrolytic capacitor of the invention [5], by avoiding a stress to the anode lead, the aforementioned effect can be obtained more assuredly.

According to the anode lead connection method of the solid electrolytic capacitor of the invention [6], a box sealed type solid electrolytic capacitor using an anode made of tungsten exerting the aforementioned effect can be produced more assuredly.

According to the production method of the solid electrolytic capacitor according to the invention [7], since the method of the invention [6] is used, a box sealed type solid electrolytic capacitor using an anode made of tungsten exerting the aforementioned effect can be produced more assuredly.

EMBODIMENTS FOR CARRYING OUT THE INVENTION

Figure 1:
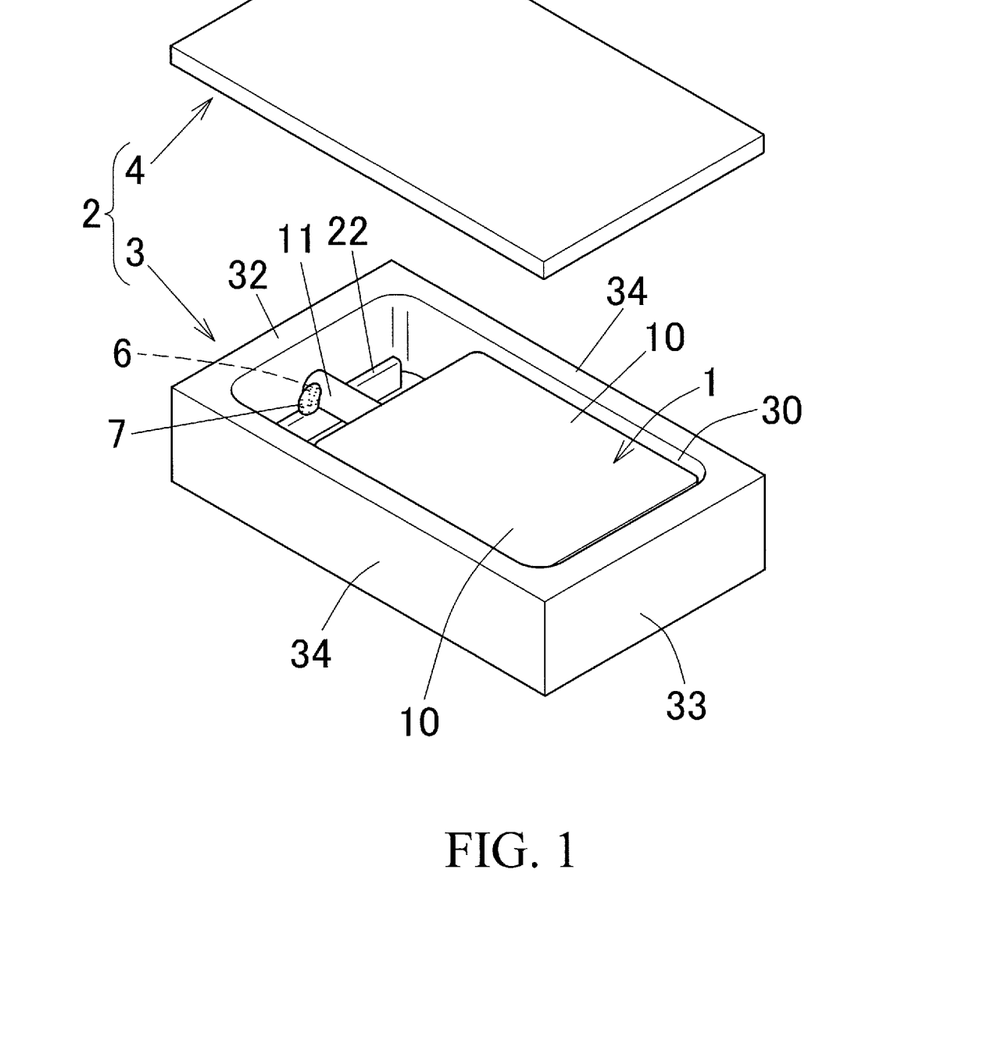
FIG. 1 is a perspective view showing a solid electrolytic capacitor according to an embodiment of the present invention in a state in which an upper lid is removed.
Figure 2:
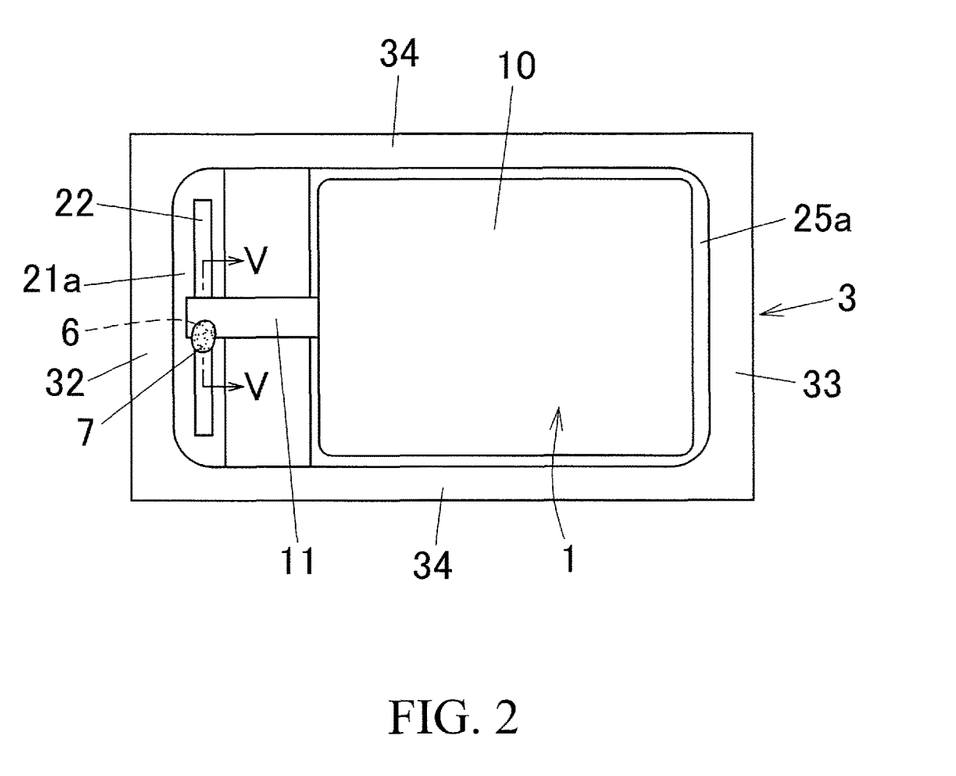
FIG. 2 is a top view showing the solid electrolytic capacitor of the embodiment in a state in which the upper lid is removed.
Figure 3A:
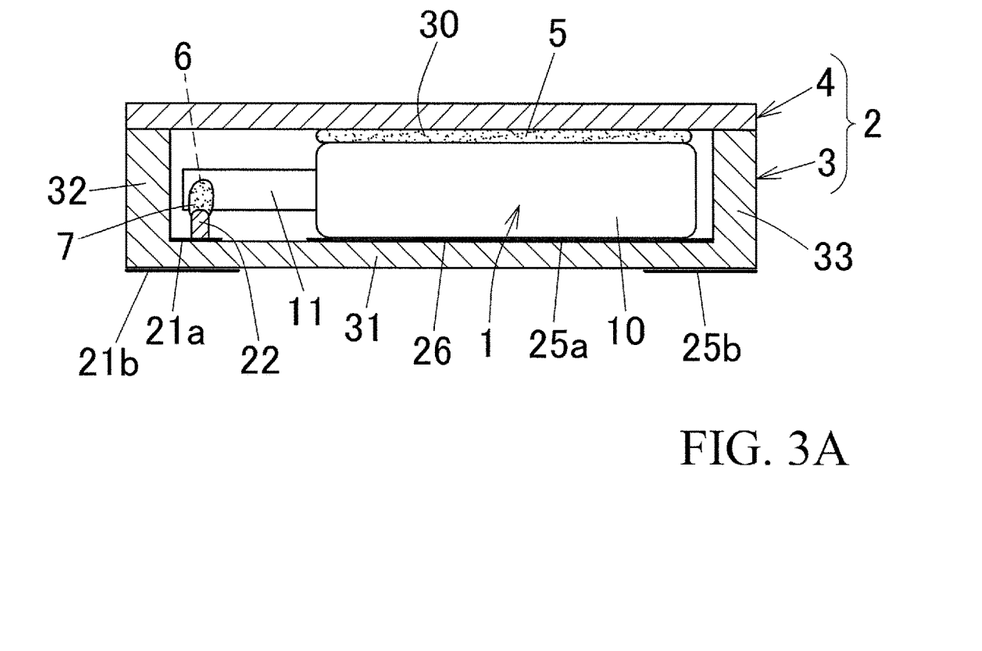
FIG. 3A is a side cross-sectional view showing the solid electrolytic capacitor of the embodiment.
Figure 3B:
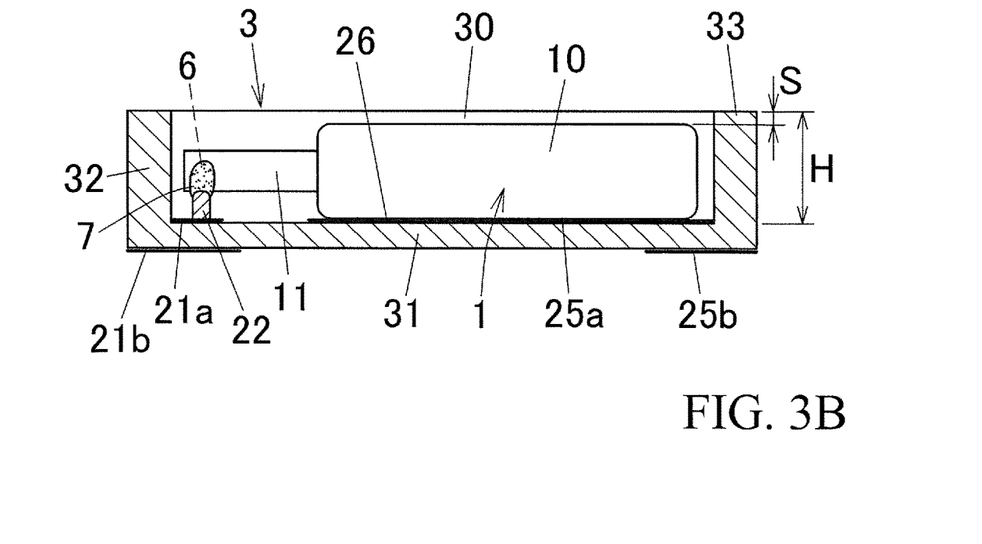
FIG. 3B is a side cross-sectional view showing the solid electrolytic capacitor of the embodiment in a state in which the upper lid is removed.

FIG. 1 is a perspective view showing a solid electrolytic capacitor according to an embodiment of the present invention in a state in which an upper lid is removed. FIG. 2 is a top view thereof in a state in which the upper lid is removed. FIG. 3A is a side cross-sectional view, and FIG. 3B is a side cross-sectional view thereof in a state in which the upper lid is removed.

For an easy understanding of the present invention, in the following explanation, the side in which the anode lead 11 of the capacitor element 1 is implanted, i.e., the left side (left hand) facing to the plane of paper of FIG. 2 is denoted as a "front side (forward side)," the right side (right hand)" is denoted as a "rear side (backward side)," the up-and-down direction is denoted as "right and left direction (both side direction)," and the upper side (upward) facing the plane of the paper of FIG. 3A is denoted as "upper side (upward)" and the lower side (downward) as "lower side (downward)."

As shown in these figures, this solid electrolytic capacitor is equipped with a rectangular parallelepiped box-shaped case 2 and a capacitor element 1 accommodated in this case 2 as fundamental structural elements.

In this embodiment, in the capacitor element 1, an element in which a sintered body obtained by sintering metal powder is subjected to a chemical conversion treatment is used as an anode. That is, the capacitor element 1 of this embodiment includes an anode which is a sintered body made of tungsten metallic material, and is formed by sequentially laminating a dielectric layer, a semiconductor layer, and an electrode layer. These sintered body, dielectric layer, semiconductor layer, and electrode layer can be formed by, for example, a known method.

In this capacitor element 1, a linear anode lead 11 as an anode, which is approximately round in cross-sectional shape, is pulled out from the front end face of the sintered body 10. This anode lead 11 is implanted at the time of sintering when producing the capacitor element 1, or is connected to an anode by welding after the sintering.

The anode lead 11 is generally formed to have a thickness thinner than the thickness of the sintered body.

Further, in this embodiment, the electrode layer laminated on the outermost sides of the capacitor element 1, i.e., five faces (upper and lower faces, both side faces, and rear end face) other than the front end face, functions as a cathode part 10.

In this embodiment, the tungsten material as the anode may include one or more of another alloy constituent or compositions in addition to the tungsten element within a range exerting no influence to the characteristics as a capacitor.

In this embodiment, the anode lead 11 is constituted by valve action metal in which the surface is covered with an oxide film, preferably by a metallic material constituted by at least one of aluminum, tantalum, niobium, titanium, and tungsten, more preferably tantalum or niobium, especially preferably tantalum.

Figure 4A:
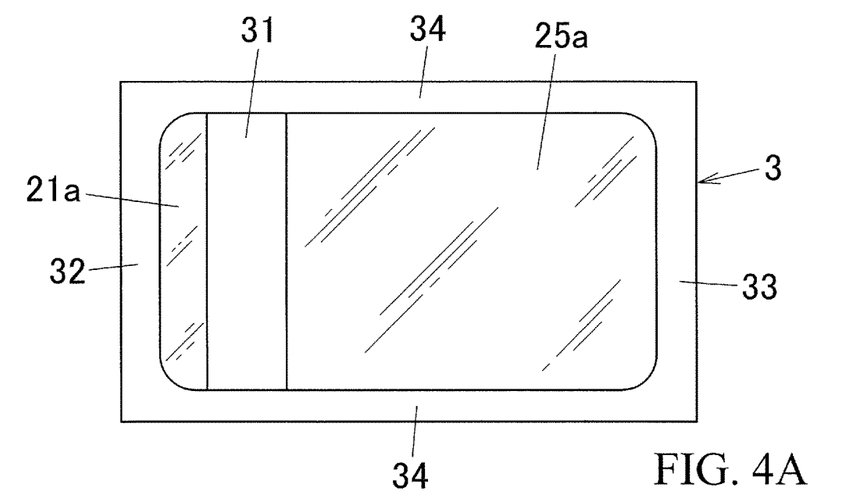
FIG. 4A is a top view showing a case main body of the solid electrolytic capacitor of the embodiment.
Figure 4B:
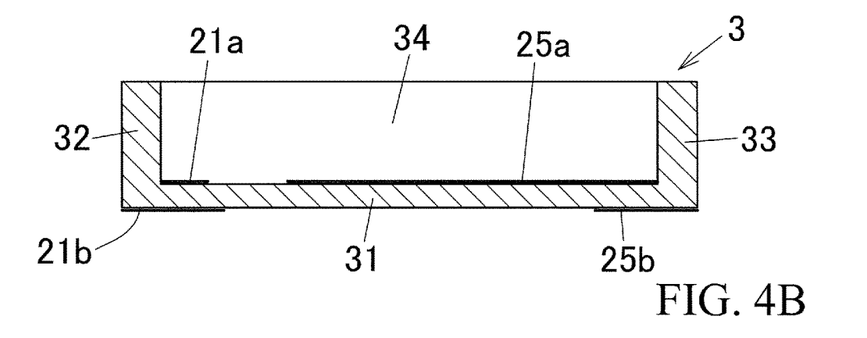
FIG. 4B is a side cross-sectional view showing the case main body of the solid electrolytic capacitor according to the embodiment.
Figure 4C:
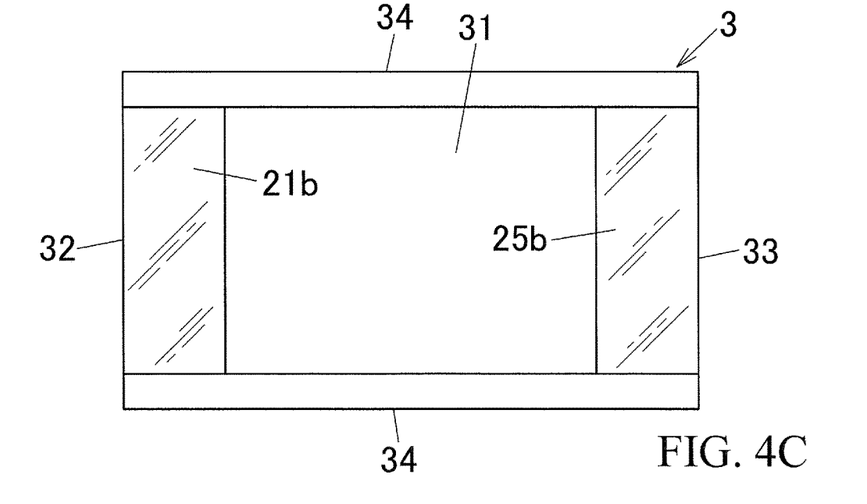
FIG. 4C is a bottom view showing the case main body of the solid electrolytic capacitor according to the embodiment.

FIGS. 4A to 4C are views showing the case main body 3 of a box shaped case 2 of the solid electrolytic capacitor according to the embodiment.

As shown in FIGS. 1 to 4C, the box-shaped case 2 of the solid electrolytic capacitor of this embodiment is equipped with a case main body 3 having a concave cross-section and an upper lid 4 to be provided at the upper opening section of the case main body 3.

The case main body 3 is equipped with a bottom wall 31 of a rectangular shape in planar view, and a front wall 32, a rear wall 33 and both side walls 34 and 34 formed on the peripheral four sides of the bottom wall 31 in a raising manner. In this embodiment, the walls 32 to 34 of the case main body 3 excluding the bottom wall 31 will be referred to as peripheral side walls.

Further, the inner side corner portions of the peripheral side walls 32 to 34 are not always required to be adjusted at 90° (degrees) with no curvature, but may be rounded corner portions with an appropriate curvature as shown in FIGS. 1 and 2.

In the present invention, the production method of the case main body 3 is not limited. As the material of the bottom wall member and the peripheral side wall member, epoxy resin, etc., can be preferably employed, and the case main body can be produced by arbitrarily processing, e.g., an epoxy resin member.

Further, the peripheral four side surfaces of the flat plate shaped bottom wall member and the inner peripheral four side surfaces and the outer peripheral four side surfaces of the frame shaped peripheral side wall member are preferably subjected to processing to prevent an occurrence of scuffing.

As shown in FIGS. 1 and 3A, the upper lid 4 is formed into a rectangular flat plate shape corresponding to the external peripheral shape of the upper end of the case main body 3 so as to close the upper opening section of the case main body 3.

As the material of the upper lid 4, in the same manner as the case main body 3, epoxy resin, etc., can be preferably employed, and the upper lid can be produced by arbitrarily processing, e.g., an epoxy resin member.

Further, also in the upper lid 4, the peripheral four side surfaces are preferably subjected to processing to prevent an occurrence of scuffing in the same manner as in the case main body 3.

On the upper surface side (inner surface side) of the bottom wall 31 of the case main body 3, an inner anode circuit pattern 21a and an inner cathode circuit pattern 25a are formed.

The inner anode circuit pattern 21a is formed at the position corresponding to the anode lead 11 of the capacitor element 1 to be accommodated in the case main body 3 in a manner as to continuously extend in the width direction of the capacitor element 1. Further, the inner cathode circuit pattern 25a is formed at the position approximately corresponding to the entire lower surface region of the capacitor element 1 to be accommodated.

Further, on the lower surface (outer surface) of the bottom wall 31 of the case main body 3, an outer anode circuit pattern 21b and an outer cathode circuit pattern 25b are formed.

The outer anode circuit pattern 21b is formed at the front end section of the lower surface of the bottom wall 31 so as to continuously extend in the width direction. Further, the outer cathode circuit pattern 25b is formed at the rear end section of the lower surface of the bottom wall 31 so as to continuously extend in the width direction.

Each circuit pattern 21a, 21b, 25a and 25b is constituted by a metallic foil such as, e.g., a copper foil, and the surface of the metallic foil is subjected to plating such as tin plating of a nickel base.

The inner anode circuit pattern 21a and the outer anode circuit pattern 21b are electrically conducted via a through-hole (not illustrated) in which a conductive layer is formed on its inner peripheral surface. Further, the inner cathode circuit pattern 25a and the outer cathode circuit pattern 25b are made to be electrically connected via the similar through-hole (not illustrated). It is enough that at least one through-hole is provided between the inner and outer circuit patterns of each of the cathode and anode, but a plurality of through-holes can be provided.

Each through-hole is plugged by being filled with resin, etc., constituting the case main body 3 such as, e.g., epoxy resin. Further, the plugged portion is subjected to plating if needed.

In this embodiment, when subjecting the plugged portion of the though-hole to plating, this plating and the plating to be subjected to the circuit patterns 21*a*, 21*b*, 25*a* and 25*b* are preferably adjusted to be the same in metallic type from the viewpoint of conductive property and also to be the same in tint from the viewpoint of appearance inspection.

Further, in this embodiment, the outer anode circuit pattern 21*b* and the outer cathode circuit pattern 25*b* are preferably formed to be the same in shape and the same in area.

Further, on the inner anode circuit pattern 21*a* of the case main body 3, corresponding to the anode lead 11 of the capacitor element 1 to be accommodated, a conductive bolster member 22 made of a metallic material, etc., is electrically and mechanically connected by welding processing or via a conductive paste (conductive adhesive agent) such as a silver paste, etc. This bolster member 22 can be considered to be a part of the anode circuit pattern to which the anode lead 11 is connected.

As the bolster member 22, it is required to have a conductivity, and it is preferable to use a copper alloy, such as, e.g., nickel silver.

Here, as shown in FIG. 3B, in this embodiment, between the upper surface of the capacitor element 1 fixed to the case main body 3 and the upper end faces of the peripheral side walls 32 to 34 of the case main body 3, a difference in height is provide so that the upper surface side of the capacitor element 1 becomes slightly lower. Between the upper surface of the capacitor element 1 inside the peripheral side walls 32 to 34 and the lower surface (plugged face) of the upper lid 4 to be mounted, an adhesive agent filling gap 30 is formed.

To form the adhesive agent filling gap 30, for example, the thickness of the capacitor element 1 (the vertical dimension of the capacitor element 1 fixed to the case main body 3) is formed so as to be smaller than the height of the peripheral side walls 32 to 34 of the case main body 3 (the dimension from the upper surface of the bottom wall 31 to the upper end faces of the peripheral side walls 32 to 34). That is, by considering the thickness of the dielectric of the capacitor element 1, the thickness of the semiconductor layer, the thickness of the electrode layer, the thickness of the cured conductive adhesive agent applied to the inner cathode circuit pattern 25*a*, etc., and by adjusting each thickness arbitrarily, it is adjusted so that the upper surface of the capacitor element 1 becomes lower than the upper end faces of the peripheral side walls 32 to 34 of the case main body 3.

On the other hand, in this embodiment, before accommodating the capacitor element 1 in the case main body 3, the anode lead 11 of the capacitor element 1 is subjected to the processing which will be mentioned later.

Figure 5:
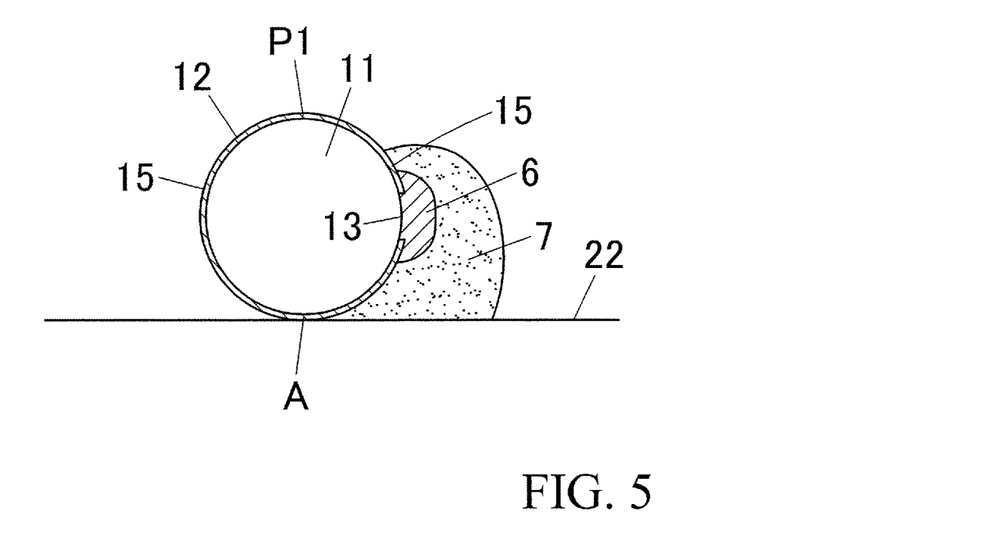
FIG. 5 is a cross-sectional view corresponding to a cross-sectional view taken along the line V-V in FIG. 2 and showing an enlarged cross-sectional view of the bolster member and its periphery of the anode lead of the solid electrolytic capacitor of the embodiment.
Figure 6:
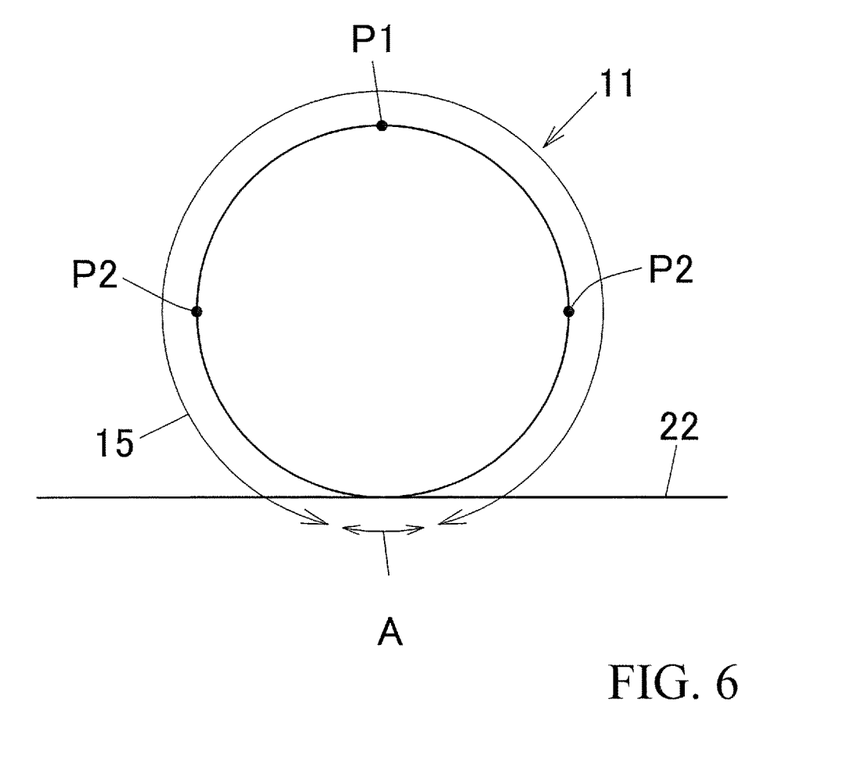
FIG. 6 is a schematic side cross-sectional view for explaining a side face of the anode lead of the solid electrolytic capacitor according to the embodiment.
Figure 7:
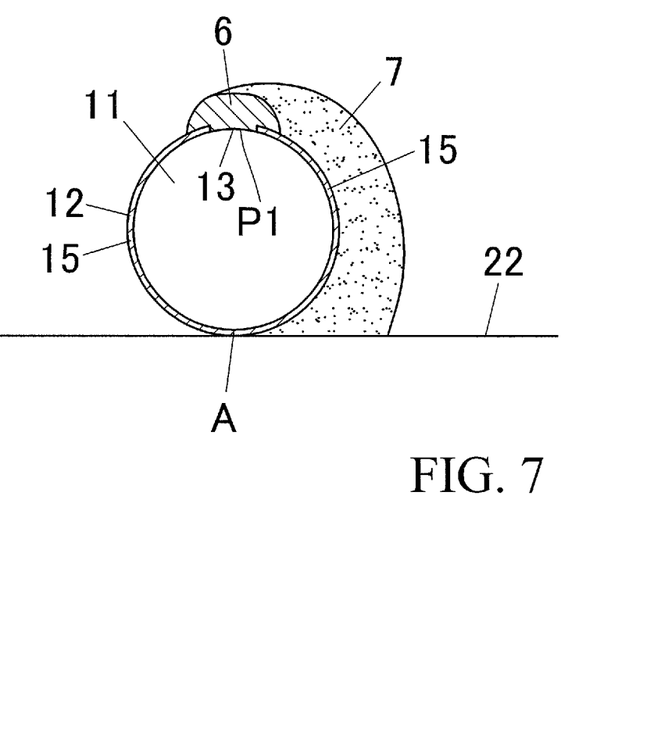
FIG. 7 is an enlarged cross-sectional view of the bolster member and its periphery of the anode lead of the solid electrolytic capacitor of Example 3 according to another embodiment of the present invention.
Figure 8:
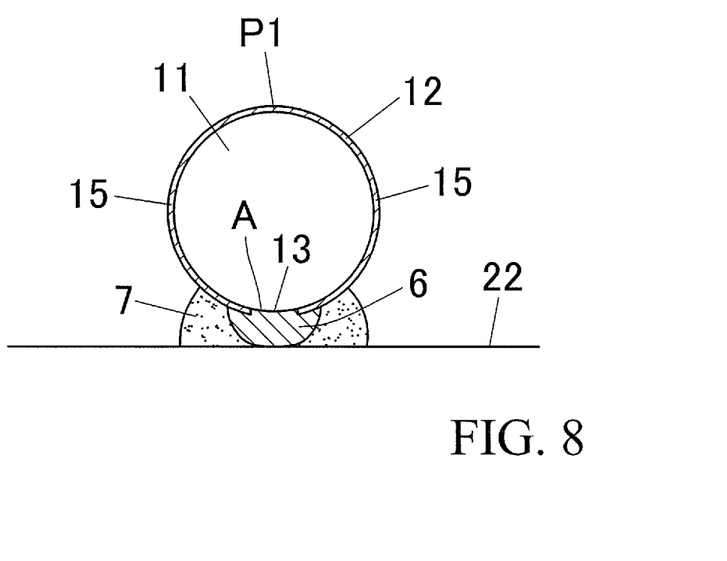
FIG. 8 is an enlarged cross-sectional view of the bolster member and its periphery of the anode lead of the solid electrolytic capacitor of Comparative Example 2 according to a second comparative example of the present invention.

FIG. 5 is a cross-sectional view taken along the line V-V in FIG. 2, which corresponds to a cross-section obtained by cutting the anode lead 11 of the capacitor element 1 by a plane perpendicular to the axis of the anode lead 11 (FIGS. 6, 7 and 8 are the same as mentioned above). As shown in FIG. 5, in this embodiment, on the side surface 15 of the anode lead 11 of the capacitor element 1, corresponding to the bolster member 22 of the case main body 3, a film removed portion 13 in which an oxide film 12 of the anode lead 11 has been removed is formed, so that the metal constituting the anode lead 11 is exposed at the film removed portion 13.

Further, by adhering a conductive material to the film removed portion 13 of the anode lead 11 and the peripheral region thereof, and solidifying it, a conductive film layer 6 made of the conductive material is formed. This conductive film layer 6 is preferable to cover the entire region of the film removed portion 13, but is not required to cover the entire region. In this embodiment, the detail structure of the film removed portion 13 and conductive film layer 6 will be explained later.

As shown in FIGS. 1 and 3, the capacitor element 1 is accommodated in the case main body 3. At this time, the cathode part 10 arranged on the lower surface side of the capacitor element 1 is electrically and mechanically connected to the inner cathode circuit pattern 25*a* of the bottom wall 31 of the case main body 3 via the conductive adhesive agent 26 (see FIGS. 3A and 3B).

Further, as shown in FIG. 5, by filling a conductive material between the conductive film layer 6 of the anode lead 11 of the capacitor element 1 and the bolster member 22 attached to the inner anode circuit pattern 21*a* of the case main body 3 to thereby connect them, a conductive connection layer 7 made of the conductive material is formed therebetween.

With this, the anode lead 11 is electrically and mechanically connected to the bolster member 22 via the conductive film layer 6 and the conductive connection layer 7. Thus, the anode lead 11 is electrically and mechanically connected to the inner anode circuit pattern 21*a* and the outer anode circuit pattern 21*b* via the bolster member 22.

Next, the connection portion of the anode lead 11 and the bolster member 22 will be explained in detail.

In this embodiment, the film removed portion 13 to be formed on the anode lead 11 is not specifically limited in the forming method, and can be constituted by, for example, a scratch, a dent, etc. Further, the film removed portion 13 may be formed in a perpendicular direction (peripheral direction), in a parallel direction, or in an oblique direction (spiral direction) with respect to the axis of the anode lead 11, or may be formed into a combined shape thereof. Further, the film removed portion 13 may be formed at plural portions. In summary, it is sufficient that in this film removed portion 13, the metal constituting the anode lead 11 is exposed.

Here, in this embodiment, as shown in FIG. 2, the capacitor element 1 is accommodated in the case main body 3 so that the anode lead 11 and the cathode part 10 of the capacitor element 1 are electrically and mechanically connected to the bolster member 22 and the inner cathode circuit pattern 25*a*, respectively. At this time, as shown in FIGS. 5 and 6, among the outer peripheral surface of the anode lead 11, the region which cannot make the anode lead 11 contact with the bolster member 22 if there exists a conductive film layer which will be mentioned later will be referred to as a lower end region A. Among the outer peripheral surface of the anode lead 11 including the lower end region A, the region excluding the lower end region A is defined as side surfaces 15 and 15. Further, in this embodiment, the portion of the outer peripheral surface of the anode lead 11 displaced by 180° (degrees) in the peripheral direction from the intermediate point of the lower end region A in contact with the bolster member in the circumference direction along the outer peripheral surface of the anode lead 11 is defined as an upper end point P1. The width of the outer peripheral surface of the anode lead 11 including the lower end region A corresponds to the length of the anode lead 11 of the lower end region A in contact with the bolster member 22 in the direction of the axis of the anode lead 11. The region excluding the lower end region A among the outer peripheral surface corresponds to the region capable of making the bolster member 22 come into contact with the anode lead 11 even if the conductive film layer exists.

Further, the criteria of the boundary between the lower end region A and the side surfaces 15 and 15 depends on the diameter of the lead wire used, the thickness of the conductive film layer, etc., and can be obtained by a preliminary experiment in which conductive film layers are formed at various position on the outer peripheral surface of the lead wire and it is confirmed whether the anode lead 11 can be brought into contact with the bolster member 22.

In this embodiment, at the position of the anode lead 11 corresponding to the bolster member 22, it is necessary to form the film removed portion 13 at a region including at least the side surface 15 among the outer peripheral surface of the anode lead 11.

Further, the conductive film layer 6 to be formed on the film removed portion 13 should be formed so as to cover at least the film removed portion 13 formed on the side surface 15. In other words, the film removed portion 13 can be formed at any position on the entire periphery of the anode lead 11, but is required to be formed at least on the side surface 15 of the anode lead 11.

That is, as shown in FIG. 8, when the film removed portion 13 is formed in the lower end region A of the anode lead 11 and a conductive film layer 6 is formed on the film removed portion 13, the conductive film layer 6 is interposed between the anode lead 11 and the bolster member 22. The thickness of the conductive film layer 6 changes every capacitor element 1, and therefore when the conductive film layer 6 of the anode lead 11 is fixed to the bolter member 22 by a conductive connection layer 7, the height of the anode lead 11 in the case main body 3, i.e., the height of the capacitor element 1, changes. For this reason, misalignments in height and/or position occur between the cathode part 10 of the capacitor element 1 and the inner cathode circuit pattern 25a of the case main body 3, preventing accurate connection of the cathode part 10 to the inner cathode circuit pattern 25a, which in turn prevents stable accommodation of the capacitor element 1 in the case main body 3.

Therefore, in this embodiment, it is necessary to structure the conductive film layer 6 so as not to be interposed between the anode lead 11 and the bolster member 22 so that the anode lead 11 directly comes into contact with the bolster member 22. That is, the conductive film layer 6 is required to be formed at a position not inhibiting the direct contact of the anode lead 11 to the anode circuit pattern.

In other words, in this embodiment, (1) in a state in which the anode lead is in direct contact with the anode circuit pattern, the conductive material adheres between the anode lead and the anode circuit pattern to form a conductive connection layer, (2) the anode lead and the conductive connection layer are connected via the conductive film layer, and (3) the conductive film layer is connected to the anode lead at the film removed portion in which the oxide film has been removed from the surface of the anode lead.

As will be apparent from the above explanation, the present invention includes these structures (1) to (3).

Further, in this embodiment, the conductive film layer 6 covering the film removed portion 13 is preferably connected so as to assuredly cover the entire region of the film removed portion 13 so that an oxide film will not be naturally formed on the film removed portion 13 by oxygen introduced from the gap between the film removed portion 13 and the conductive film layer 6, or so that the connection resistance to the bolster member 22 can be reduced.

In this embodiment, it is not preferable that the conductive material as the conductive film layer 6 covering the film removed portion 13 is adhered and fixed up to the lower end region A of the anode lead 11 exceeding a required region of the anode lead 11 because of the reason mentioned above.

However, in the present invention, the structure that the film removed portion 13 is formed at the upper end point P1 of the side surface 15 of the anode lead 11 and the conductive film layer 6 is formed so as to cover the film removed portion 13 is included within the scope of the present invention.

Further, in this embodiment, the film removed portion 13 can be formed either side surface of the anode lead 11, or the right side surface 15 or the left side surface 15 of the anode lead 11, or can also be formed on both side surfaces.

In this embodiment, it is preferable that after forming the film removed portion 13 on the anode lead 11, a conductive material is promptly adhered and solidified to form a conductive film layer 6 covering the entire region of the film removed portion 13.

That is, in cases where the film removed portion 13 is formed on the anode lead 11 in the air by scratching or the like, an air oxide film is formed at the film removed portion 13. It is assumed that the formation of the air oxide film progresses as the time advances, and therefore it is preferable to adhere the conductive material within several minutes, preferably within 30 seconds, after forming the film removed portion 13 to thereby form a film.

Further, if the surrounding environment at the time from forming the film removed portion 13 till forming the conductive film layer 6 is a low temperature, low humidity and low oxygen atmosphere, oxidization is suppressed. Therefore, it is preferable to set to a low temperature, low humidity and low oxygen atmosphere. When the film removed portion 13 and the conductive film layer 6 are formed in an inert gas atmosphere, no oxidization occurs, and therefore it is more preferable.

As a conductive material constituting the conductive film layer 6, a solder or a conductive paste (conductive adhesive agent) can be exemplified. Among them, the solder requiring a relatively high temperature at the time of being molten and solidifying has a higher possibility of exerting a harmful influence due to heat to the capacitor element 1. Therefore, it is preferable to employ a conductive paste rather than employing a solder. As the conductive paste, although a known conductive paste can be used, it is preferable to use an economic silver paste excellent in conductivity and not extremely expensive to lower the ESR of the produced sold electrolytic capacitor.

It is conceivable to directly connect a metal or an alloy which is not a valve action metal to the film removed portion 13 without using the aforementioned conductive material structuring the conductive film layer 6 or the conductive connection layer 7, or to simultaneously perform the formation of the film removed portion 13 and the connection. These, however, are not preferable when considering the facts that the fine connection processing to the anode lead 11 connected to the sintered body is difficult, a poor connection likely occurs, and oxidization of the anode lead 11 at the scratched portion (film removed portion 13) progresses when it becomes high temperatures. Further, it is conceivable to perform electric plating processing or chemical plating processing, but such processing results in an increased cost and an increased number of steps, and therefore it is not preferable.

In this embodiment, the step of forming the film removed portion 13 by scratching the anode lead 11 and forming the conductive film layer 6 by adhering and solidifying a conductive material can be performed at any time until the production of the capacitor element 1 is completed, but it is preferable to perform the step after completion of the post-chemical conversion step which is a final repairing step of the dielectric layer.

In the capacitor element 1 in which the film removed portion 13 and the conductive film layer 6 are formed on the anode lead 11, when the length of the anode lead 11 is longer than a predetermined dimension, after cutting into a predetermined dimension, the anode lead 11 may be arranged on the bolster member 22, and the conductive film layer 6 and the bolster member 22 may be electrically and mechanically connected by the conductive material as the conductive connection layer 7.

As the conductive material constituting the conductive connection layer 7, from the same reasons for the conductive material for the conductive film layer 6, the same type of material, for example, a solder, or a conductive paste such as, e.g., a silver paste can be used. Further, in the case of using a silver paste at each portion, the silver paste for each portion may be the same or different in type.

In this embodiment, as explained above, after fixing the capacitor element 1 in the case main body 3, the upper lid 4 is attached so as to close the upper opening section of the case main body 3. In this case, in addition to that the peripheral edge portion of the lower surface side (inner surface side) of the upper lid 4 and the upper end faces of the peripheral side walls 32 to 34 of the case main body 3 are adhered by an adhesive agent, the adhesive agent 5 is filled also in between the upper surface of the cathode part 10 of the capacitor element 1 and the inner surface (the upper wall inner surface of the box-shaped case 2) of the upper lid 4, so that the upper surface of the capacitor elements 1 and 1 and the inner surface of the upper lid 4 are adhesively fixed via the adhesive agent 5.

As the adhering method of the adhesive agent 5, for example, before attaching the upper lid 4 to the case main body 3, the adhesive agent 5 is previously applied to a required region on the lower surface side of the upper lid 4, and then the upper lid 4 with the adhesive agent is attached to the upper opening section of the case main body. Alternatively, the adhesive agent 5 is applied to the upper surface of the capacitor element 1 accommodated in the case main body 3 and the upper end faces of the peripheral side walls 32 to 34, and then the upper lid 4 is attached to the upper end opening section of the case main body 3. Needless to say, in the present invention, the adhering method of the adhesive agent 5 is not limited, and the adhesive agent 5 may be adhered by any method. In short, it is enough to fill the adhesive agent 5 in the empty space between the upper surface of the capacitor element 1 and the upper lid 4.

In this embodiment, when the thermal conductivity of the adhesive agent 5 is not especially high, the thermal stress to the capacitor element can be suppressed and therefore it is preferable.

Accordingly, in this embodiment, as the adhesive agent 5, it is preferable to use an insulating adhesive agent, especially an acrylic resin based adhesive agent or an epoxy resin based adhesive agent. In general, a material of $10^6$ Ω/m or more is classified into an insulating material.

Further, in this embodiment, the adhesive agent 5 may contain a solvent other than an adhesive component (adhering resin) if needed. Further, in this embodiment, it is conceivable that a filler not high in thermal conductivity, e.g., oxide fine powder represented by zirconia or silica, is preferably blended. More preferably, the thermal conductivity of the filler is 10 W/(m·K) or less at 25° C.

In this embodiment, the adhesive agent 5 may be applied to at least a part of the upper surface of the capacitor element 1, preferably applied to the entire upper surface of the capacitor element 1 to adhere the entire upper surface to the upper lid 4. Concretely, it is preferable that 90% or more of the region on the upper surface of the capacitor element 1 is connected to the upper lid 4 by the adhesive agent 5. That is, as the adhesion area of the capacitor element 1 to the upper lid 4 increases, the upper lid 4 can be attached in a stable manner, which in turn can more assuredly prevent thermal deformation of the upper lid 4 which will be explained later.

Further, as long as the adhesive agent 5 fits in the box-shaped case 2, the adhesive agent 5 can protrude from the upper surface of the capacitor element 1. However, to avoid the stress to the anode lead 11, it is preferable that an air gap remains around the anode lead 11, especially around the base portion to the anode.

Thus, a box sealed type (chip-shaped) solid electrolytic capacitor having a built-in capacitor element 1 is produced.

As explained above, according to the solid electrolytic capacitor of this embodiment, the oxide film 12 of the anode lead 11 of the capacitor element 1 is removed to form the film removed portion 13 on the anode lead 11, and the conductive film layer 6 is formed on the film removed portion 13, while the conductive connection layer 7 is applied in between the conductive film layer 6 and the bolster member 22 of the case main body 3 to thereby electrically and mechanically connect them. Therefore, the anode lead 11 and the bolster member 22 can be assuredly connected electrically and mechanically while assuredly preventing an occurrence of open failure.

Further, in this embodiment, since the lower end region A of the anode lead 11 is in direct contact with the bolster member 22, it becomes possible to prevent an occurrence of variations of the height position of the anode lead 11 to the bolster member 22, i.e., the height position of the capacitor element 1 to the case main body 3, enabling the fixing of the capacitor element 1 to the case main body 3 in an accurately positioned state. This assuredly prevents a positional displacement of the capacitor 1 and/or an occurrence of bad connection between the electrode portions, which in turn can provide a high quality capacitor product.

Further, in this embodiment, when the forming portion of the film removed portion 13 is on the side surface 15, the effects of the present invention are exerted. When the forming position is closer to the bolster member 22, the electric circuit between the anode lead 11 and the bolster member 22 can be relatively shortened and the amount of the conductive material therebetween can also be reduced. For this reason, the ESR can also be kept small, and therefore it is preferable.

In this embodiment, since resistance welding is not used when connecting the anode lead 11 and the bolster member 22, defects due to the resistance welding, such as, e.g., an occurrence of open failure due to current control faults, deformations of the anode lead due to the increase of the weld strength, etc., can be prevented assuredly.

Further, according to the box sealed type solid electrolytic capacitor of this embodiment, since the upper lid 4 is adhesively fixed to the upper surface of the capacitor element 1 via the adhesive agent 5, approximately the entire area of the space between the upper lid 4 and the capacitor element 1 is filled by the adhesive agent. For this reason, when mounting the solid electrolytic capacitor on an electronic circuit board, even if a high temperature is applied to the upper lid 4, it is possible to prevent defects such as deflation or inflation of the upper lid 4.

Further, as the adhesive agent 5, the aforementioned insulating adhesive agent is used, and therefore the effect of the thermal stress to the capacitor element in the mounted state can be suppressed. As a result, it is conceivable that the leak current of the capacitor element 1 will not be increased extremely, preventing deterioration of the leak current characteristics, which in turn can obtain a capacitor having a higher performance.

Figure 9:
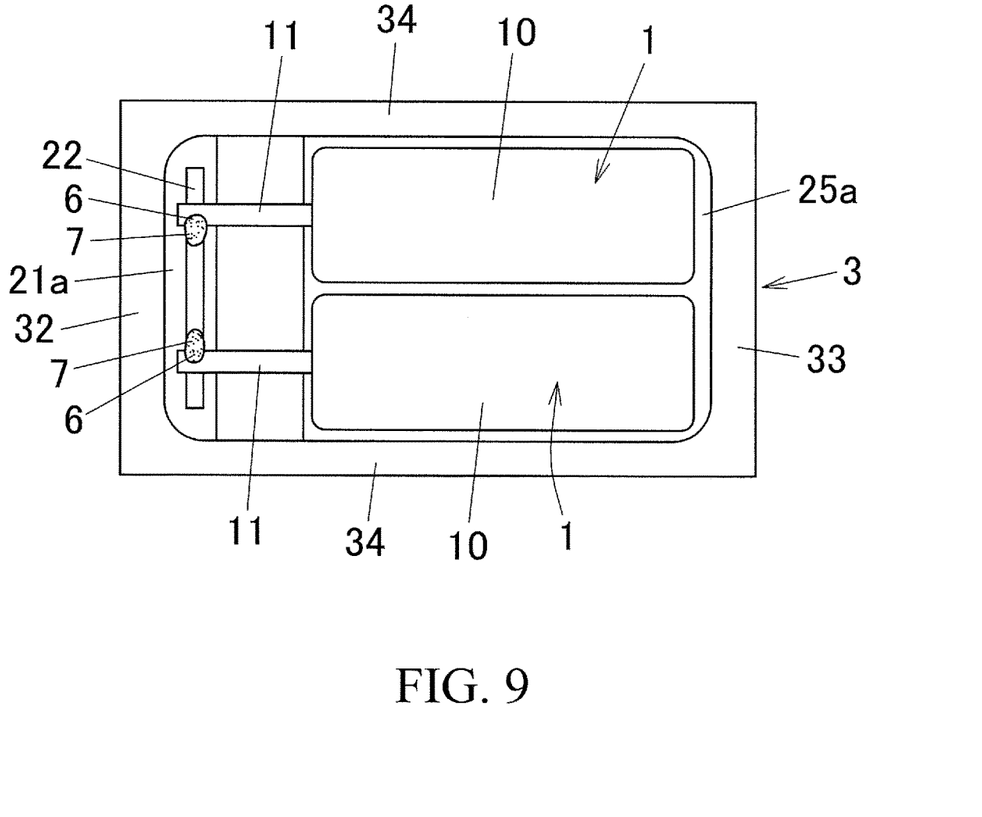
FIG. 9 is a top view showing a solid electrolytic capacitor according to a modified embodiment of the present invention in a state in which an upper lid is removed.

In the aforementioned embodiment, the explanation was directed to the case in which a single capacitor element 1 is accommodated in the box-shaped case 2, but the present invention is not limited to it. A plurality of capacitor elements 1 can be accommodated in a single box-shaped case 2. For example, as shown in FIG. 9, two capacitor elements 1 and 1 may be accommodated in a box-shaped case 2 (case main body 3) in parallel configuration with the drawing direction of the anode leads 11 and 11 aligned. In such a case, as shown in FIG. 9, the conductive film layers 6 and 6 covering the respective film removed portions 13 and 13 of both the anode leads 11 and 11 are connected to a single bolster member 22 by the conductive connection layers 7 and 7.

Further, in this embodiment, the explanation was directed to the case in which a capacitor element 1 having an anode lead 11 approximately round in cross-section was employed, but in the present invention, the cross-sectional shape of the anode lead 11 is not limited only to a round shaped. Other than the round cross-sectional shape, in the present invention, a capacitor element having an anode lead of a flat cross-section, an anode lead of a polygonal cross-section, such as a quadrilateral or hexagonal cross-section, an anode lead of an oval or elliptical cross-section, or an anode of a modified cross-section can be employed. For example, in the case of employing a capacitor element having an anode lead of a polygonal cross-section, the portion corresponding to the lower end face of the outer peripheral surface of the anode lead constitutes a lower end region, and the portion displaced by 180° (degrees) with respect to the lower end region constitutes the upper end point.

Further, in this embodiment, the explanation was directed to the case in which a capacitor element 1 having an approximately linear anode lead 11 was employed, but in the present invention, the longitudinal shape of the anode lead 11 is not limited only to a linear shape. In cases where there exists a height difference between the anode lead implanted position and the inner anode circuit pattern 21a, the anode lead may be formed into a curved shape to balance out the height difference so that the anode lead is connected to the inner anode circuit pattern without intervening the bolster member. The shape of the anode lead may be a shape of a curve line having a single or plural curvatures or a step shape having a single or plural right angle bent portions.

EXAMPLES

Hereinafter, Examples related to the present invention and Comparative Examples deviating the gist of the present invention will be detailed.

Example 1

Capacitor elements explained below were prepared. That is, powder in which commercially available 0.3 mass % silicon powder having a volume mean particle diameter of 1 µm (0.3 µm to 3.4 µm) was added to commercially available tungsten powder having a volume mean particle diameter of 0.6 µm (0.1 to 15 µm) was processed under vacuum of $10^{-2}$ Pa at a temperature of 1,420° C. for 30 minutes. Further, this powder was returned to a room temperature and the blocked object was crushed to obtain granulated powder having a volume mean particle diameter of 96 µm (26 µm to 180 µm). After shaping the granulated powder with a tantalum wire (anode lead 11) having a diameter of 0.29 mm implanted, the shaped body was sintered under vacuum of $10^{-2}$ Pa at a temperature of 1,530° C. for 20 (twenty) minutes. Thus, 2,000 pieces of rectangular shaped sintered bodies having a dimension of 1.0 mm×1.5 mm×4.45 mm were prepared. In this sintered body, at the center of the face of 1.0 mm×1.5 mm, the tantalum wire was implanted with buried inside by 3.7 mm and pulled outside by 6.0 mm and constituted as an anode lead 11. The anode lead 11 was approximately round in cross-section, and in the cross-section, the diameter was 0.29 mm, and the circumference was 0.91 mm.

Then, the sintered body was subjected to a chemical conversion treatment as an anode in 3 mass % of potassium persulfate solution at 45° C. by 10 V for 6 hours and then rinsed in water, then cleaned with ethanol. Immediately after, it was subjected to high temperature processing in air at 190° C. for 30 minutes and then returned to a room temperature to thereby form a dielectric layer on the anode body and the root part of the anode lead. Thus, a dielectric was produced.

Further, a semiconductor layer of a conductive polymer in which anthraquinone sulfonic acid was doped to polyethylenedioxythiophene, a carbon layer, and a silver layer were laminated on the dielectric layer made of the dielectric in this order to thereby produce a tungsten solid electrolytic capacitor element 1. The carbon layer and the silver layer were not formed on the 1.0 mm×1.5 mm face (front face) of the sintered body in which the anode lead was implanted and the anode lead 11.

As shown in FIG. 5, at the position away from the implanted portion of the anode lead 11 by 1.3 mm toward the tip end of the anode lead 11 of this capacitor element 1, or the position of the case main body 3 corresponding to the bolster member 22, while blowing a nitrogen gas in a direction perpendicular to the axial center of the anode lead 11 and in a direction parallel to the 1.0×4.45 mm face (side surface) of the sintered body, scratches of a length of 0.3 mm were made in the circular direction (circumferential direction) by a file to thereby form a film removed portion 13. In other words, as shown in FIG. 6, at the portion P2 of the anode lead 11 displaced by 90° (degrees) from the upper endpoint P1 in the circular direction (circumferential direction), a scratch of a length of 0.3 mm was formed along the circular direction (circumferential direction) to thereby form a film removed portion 13. This film removed portion 13 was 0.2 mm in length in the axial center direction of the anode lead 11 and 0.07 mm in the maximum depth.

Subsequently, a silver paste was quickly applied so as to cover the entire region of the film removed portion 13, and dried and solidified in air at a temperature of 105° C. for 20 minutes to thereby form a conductive film layer 6 of the silver paste. This conductive film layer 6 was protruded up to 0.3 mm in the radially outward direction from the outer peripheral surface of the anode lead 11.

On the other hand, in order to accommodate the aforementioned capacitor element 1, the following box-shaped case 2 was prepared. That is, as the bottom wall member for producing the bottom wall 31 of the case main body 3, a glass epoxy resin substrate of length 7.3 mm×width 4.3 mm×thickness 0.3 mm was prepared. On the upper surface of the glass epoxy resin substrate, as shown in FIG. 4A, an inner cathode circuit pattern 25a of 3.5 mm×4.7 mm was formed. This 3.5 mm corresponds to the dimension of the width direction, and 4.7 mm corresponds to the dimension of the front-back direction.

Further, on the upper surface of the glass epoxy resin substrate, an inner anode circuit pattern 21a of 3.5 mm×0.6 mm was formed with a distance spaced forward by 1.0 mm with respect to the inner cathode circuit pattern 25a. This 3.5 mm corresponds to the dimension of the width direction, and 0.6 mm corresponds to the dimension of the front-back direction.

Further, on the lower surface of the substrate as the bottom wall member, as shown in FIG. 4C, an outer anode circuit pattern 21b of 3.4 mm×1.3 mm was formed at the front portion of the lower surface of the bottom wall member, and an outer cathode circuit pattern 25b having the same size was formed at the rear portion. This 3.4 mm corresponds to the dimension of the width direction, and 1.3 mm corresponds to the dimension of the front-back direction.

Each circuit pattern 21a, 21b, 25a, and 25b was made of a copper foil adhered on the glass epoxy resin substrate as the bottom wall member, and a tin plating of a nickel base was subjected to the surface. Further, the anode circuit patterns 21a and 21b and the cathode circuit patterns 25a and 25b above and below the substrate as the bottom wall member were electrically conducted via a through-hole having a diameter of 0.4 mm formed at one place in the center of each overlap range of the circuit patterns above and below the substrate. This through-hole was closed so that the surface is flush with the substrate as the bottom wall member by the epoxy resin. Further, on both end faces of the through-hole, plating similar to each circuit pattern 21a, 21b, 25a and 25b was subjected.

Further, as a peripheral side wall member for producing peripheral side walls 32 to 34 of the case main body 3, a rectangular frame or rectangular circular member obtained by cutting and removing the inner portion of a glass epoxy resin member having a length of 7.3 mm, a width of 4.3 mm, and a thickness of 1.2 mm except for the four sides (0.5 mm in the width direction, and 0.4 mm in the longitudinal direction) was prepared. This frame member as the peripheral side wall member was arranged on the upper surface of the substrate as the bottom wall member with the direction aligned, and connected by heating and pressing using an insulating adhesive agent. Thus, a box (case main body 3) having a concave cross-section was produced (see FIG. 4B).

On the inner anode circuit pattern 21a inside of the case main body 3, a rectangular shaped bolster member 22 constituted by nickel silver was fixed by solidifying a silver paste. Solidification of the silver paste was performed at 105° C. for 20 minutes.

In the case main body 3 produced as mentioned above, the capacitor element 1 in which the film removed portion 13 of the anode lead 11 was covered by the conductive film layer 6 was accommodated and fixed. That is, the cathode part 10 arranged on the lower surface side of the capacitor element 1 and the inner cathode circuit pattern 25a of the case main body 3 were electrically and mechanically connected by the conductive adhesive agent 26 constituted by a silver paste. Further, after accommodating the capacitor element 1 in the case main body 2 so that the lower end of the anode lead is in direct contact with the bolster member 22, a new silver paste was adhered so as to cover approximately the entire region of the conductive film layer 6 of the anode lead 11 and come into contact with a part of the bolster member 22, so that the conductive film layer 6 of the anode lead 11 and the bolster member 22 were connected by the new silver paste. Then, the new silver paste was solidified by heating at 105° C. for 20 minutes to form the conductive connection layer 7, and the conductive film layer 6 and the bolster member 22 were electrically and mechanically connected by the conductive connection layer 7.

In this Example 1, as the silver paste for, e.g., the conductive film layer 6, the conductive connection layer 7, and the conductive adhesive agent 26, a silver paste which becomes a mixture of 95 mass % of flat silver powder having an average particle diameter of 1 μm and 5 mass % of PMMA made by Sigma-Aldrich Corporation was used. Further, as the solvent of the silver paste, butyl acetate was used.

Subsequently, as the upper lid 4, a glass epoxy resin member having a dimension of 7.3 mm×4.3 mm and a thickness of 0.3 mm was prepared. An adhesive agent 5 was adhered to the entire region of the lower surface (rear surface) of the upper lid 4 and the upper lid 4 was laid on the upper portion of the case main body 3 and adhered thereto. At the same time, the upper lid 4 was connected to the cathode part 10 constituted by the upper surface of the capacitor element 1, and the adhesive agent 5 was cured and solidified. As the adhesive agent 5, an acrylate resin based adhesive agent (poly(methyl methacrylate) powder (M.W. 60,000) made by Sigma-Aldrich Corporation was solved in 6 mass % butyl acetate) blended with 10 mass % zirconia powder (made by Kanto Chemical Co., Inc.) was used.

A total of 126 pieces of box sealed type solid electrolytic capacitors according to Example 1 having the aforementioned structure were produced. Then, it was confirmed whether the anode lead 11 and the bolster member 22 were assuredly connected to each solid electrolytic capacitor electrically and mechanically. The results were that all of them were assuredly connected and no open failure occurred.

Further, the ESR of 100 kHz was measured to each solid electrolytic capacitor of Example 1. The average value could be kept as low as 9 mΩ (8 to 11 mΩ), and it had an excellent performance with regard to the ESR.

Example 2

In Example 1, the film removed portion 13 formed at the anode lead 11 was formed at the portion P2 displaced by 90° (degrees) from the upper endpoint P1 in the circular direction (circumferential direction) to have a length of 0.3 mm in the circumferential direction. While, in this Example 2, a film removed portion 13 was formed on the entire periphery of the anode lead 11. Further, in this Example 2, the conductive film layer 6 was formed at the portion of a length of 0.3 mm in the peripheral direction of the film removed portion 13, which is a part of the film removed portion 13, specifically only at the same portion and the same dimension as in Example 1, and the other part of the film removed portions 13 remained to be exposed. Except for the above, in the same manner as in Example 1, a total of 126 pieces of solid electrolytic capacitors were produced.

In the solid electrolytic capacitor obtained as mentioned above according to Example 2, no open failure occurred. As to the ESR value, four capacitors showing abnormal values exceeding 35 mΩ were found. The average ESR value of 122 capacitors excluding the four capacitors was 9 mΩ (8 to 13 mΩ).

In the solid electrolytic capacitors of this Example 2, no open failure occurred. By removing capacitors showing abnormal ESR values, it was possible to sufficiently cope with actual usage.

Example 3

A film removed portion 13 was formed on the upper end point P1 of the anode lead 11 (see FIG. 7). In other words, a film removed portion 13 having a length of 0.3 mm in the circular direction with the upper end point P1 being a central point was formed. Further, in the same manner as in the aforementioned Example 1, a conductive film layer 6 was formed so as to cover the entire region of the film removed portion 13 of the anode lead 11.

Further, the conductive film layer 6 and the bolster member 22 were connected by the conductive connection layer 7 in the same manner as in the aforementioned Example 1. Except for the above, in the same manner as in the aforementioned Example 1, a total of 126 pieces of solid electrolytic capacitors were produced.

In the solid electrolytic capacitor obtained as mentioned above according to Example 3, no open failure occurred. On the other hand, the average ESR value was 13 mΩ (11 to 16 mΩ), and it was sufficient to cope with the actual use regarding the ESR.

Comparative Example 1

A total of 126 pieces of solid electrolytic capacitors of Comparative Example 1 were produced in the same manner as in Example 1 except that a capacitor element 1 in which no film removed portion (scratching) 13 was formed on the anode lead 11 was prepared and this capacitor element 1 was connected to the bolster member 22 of the case main body 2 by welding.

The welding for connecting the anode lead 11 and the bolster member 22 was performed using a resistance welding machine made by Panasonic Avionics Corporation under the conditions of energy 2.5 Ws and pressure 12 N.

In the solid electrolytic capacitor obtained in Comparative Example 1, the average ESR value was 9 mΩ (8 to 11 mΩ). However, open failure occurred in 7 capacitors.

Comparative Example 2

A number of solid electrolytic capacitors 1 were produced in the same manner as in Example 1 except that a film removed portion 13 having a length of 0.3 mm in the circular direction at the lower end region A of the anode lead 11 was formed (see FIG. 8) and a conductive film layer 6 was formed so as to cover the film removed portion 13. In these capacitor elements 1, the thickness of the conductive film layer 6 could not be adjusted for each element to be produced, and therefore variation occurred in thickness.

It was attempted to produce solid electrolytic capacitors by accommodating these capacitor elements 1 in the same case main bodies 2 as in the aforementioned Example 1. However, there were variations in thickness of the conductive film layer 6 for each capacitor element 1 and therefore, in some capacitor elements 1, the cathode part 10 of the lower surface of the capacitor element 1 could not secure the horizontality with respect to the inner cathode circuit pattern 25a. For this reason, a number of capacitor elements (solid electrolytic capacitors) unable to be mounted on (contact with) the case main body 3 of the capacitor element 1 were produced, and there caused such problems that the upper lid 4 could not be assuredly adhered. Accordingly, before producing a predetermined number of solid electrolytic capacitors, it was judged that a high quality capacitor product could not be produced, and the subsequent work (experiment) was stopped.

Comparative Example 3

In the same manner as in Example 1, a film removed portion 13 was formed on the anode lead 11 to have a length of 0.3 mm in the circumferential direction. Immediately after immersing it in a hydrochloric acid solution of 10 volume %, it was immersed in a plating solution to perform electroless tin plating of the lead wire. A solid electrolytic capacitor was produced in the same manner as in Example 1 except that a lead wire subjected to electroless tin plating was used. Open failure occurred in 10 capacitors. The average ESR value of the remaining 116 pieces was 16 mΩ (13 to 20 mΩ). The ESR was large, and it was unsuitable for the actual use. It is considered that an oxide film was already formed again at the scratched portion of the lead wire at the time of the activation treatment by the hydrochloric acid aqueous solution before the electroless tin plating and the existence of the oxide film increased the resistance regardless of the execution of the electroless tin plating.

<Evaluation>

As will be apparent from the above results, in the solid electrolytic capacitors of Examples 1 to 3 related to the present invention, good evaluations were obtained. Especially, in the solid electrolytic capacitor in which the film removed portion 13 was formed on the side surface of the anode lead 11 and the film removed portion 13 was connected by the conductive film layer 6 and the conductive connection layer 7, any occurrence of open failure was not observed at all, and good results were obtained regarding the ESR as well.

On the other hand, in the solid electrolytic capacitors of Comparative Examples 1 to 3 deviating the gist of the present invention, open failures occurred, or no good evaluation regarding the ESR could be obtained.

This application claims priority to Japanese Patent Application No. 2013-126578 filed on Jun. 17, 2013, and the entire disclosure of which is incorporated herein by reference in its entirety.

It should be understood that the terms and expressions used herein are used for explanation and have no intention to be used to construe in a limited manner, do not eliminate any equivalents of features shown and mentioned herein, and allow various modifications falling within the claimed scope of the present invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" is meant as a non-specific, general reference and may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

INDUSTRIAL APPLICABILITY

The anode lead connection method of the solid electrolytic capacitor of the present invention can be applicable when producing a box sealed type solid electrolytic capacitor using a capacitor element having an anode made of tungsten.

DESCRIPTION OF SYMBOLS

1: capacitor element
11: anode lead
12: oxide film
13: film removed portion
15: side surface
2: box-shaped case
6: conductive film layer
7: conductive connection layer
A: lower end region
P1: upper end point

The invention claimed is:

1. A solid electrolytic capacitor comprising:
a capacitor element equipped with an anode made of tungsten, the anode including an anode lead implanted in the anode and covered with an oxide film, and the anode lead being protruded from an end face of the anode; and
a box shaped case in which the capacitor element is accommodated, the box shaped case including a bottom wall inner surface to which an anode circuit pattern is provided, and the anode lead being connected to the anode circuit pattern electrically and mechanically,
wherein in a state in which the anode lead is directly connected to the anode circuit pattern, between the anode lead and the anode circuit pattern, a conductive material is adhered and a conductive connection layer is formed,
wherein the anode lead and the conductive connection layer are connected via a conductive film layer, and
wherein the conductive film layer is connected to the anode lead at a film removed portion in which the oxide film is removed from a surface of the anode lead.

2. The solid electrolytic capacitor as recited in claim 1, wherein a bolster member as a conductive auxiliary member is provided on the anode circuit pattern of the bottom wall inner surface of the box-shaped case, and wherein the anode lead is connected to the bolster member.

3. The solid electrolytic capacitor as recited in claim 1, wherein the conductive film layer is formed so as to cover an entire region of the film removed portion.

4. The solid electrolytic capacitor as recited in claim 1, wherein an upper wall inner surface of the box-shaped case and an upper surface of the capacitor element are adhesively fixed via an adhesive agent.

5. The solid electrolytic capacitor as recited in claim 1, wherein a gap is provided around a base portion of the anode lead to the anode.

6. An anode lead connection method of a solid electrolytic capacitor for electrically and mechanically connecting an anode lead protruded from an end face of an anode made of tungsten and covered with an oxide film to an anode circuit pattern separately provided, comprising:
forming a film removed portion by removing the oxide film;
forming a conductive film layer by adhering a conductive material on the film removed portion;
connecting the conductive film layer and the anode circuit pattern by adhering the conductive material to form a conductive connection layer between the conductive film layer and the anode circuit pattern in a state in which the anode lead is directly connected to the anode circuit pattern, and
wherein the conductive film layer is formed at a position not interfering direct contact of the anode lead to the anode circuit pattern.

7. A production method of a solid electrolytic capacitor including a capacitor element equipped with an anode made of tungsten, the anode including an anode lead implanted in the anode and covered with an oxide film, and the anode lead being protruded from an end face of the anode, and a box shaped case in which the capacitor element is accommodated, the box shaped case including a bottom wall inner surface to which an anode circuit pattern is provided, and the anode lead being connected to the anode circuit pattern,
wherein a connection of the anode lead to the anode circuit pattern is performed by the method as recited in claim 6.

* * * * *